US009305115B1

(12) United States Patent
Estan

(10) Patent No.: US 9,305,115 B1
(45) Date of Patent: Apr. 5, 2016

(54) METHOD AND APPARATUS FOR REDUCING POWER CONSUMPTION DURING RULE SEARCHES IN A CONTENT SEARCH SYSTEM

(75) Inventor: Cristian Estan, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 857 days.

(21) Appl. No.: 13/247,850

(22) Filed: Sep. 28, 2011

Related U.S. Application Data

(60) Provisional application No. 61/389,554, filed on Oct. 4, 2010.

(51) Int. Cl.
G06F 12/00 (2006.01)
G06F 17/30 (2006.01)
G06F 1/32 (2006.01)
G06F 3/06 (2006.01)

(52) U.S. Cl.
CPC ........ *G06F 17/30982* (2013.01); *G06F 1/3275* (2013.01); *G06F 3/0625* (2013.01); *G06F 3/0634* (2013.01); *G06F 3/0679* (2013.01)

(58) Field of Classification Search
CPC ............ G06F 17/30982; G06F 3/0625; G06F 3/0634; G06F 3/0679; G06F 1/3275; G11C 15/00
USPC .......................................................... 711/108
See application file for complete search history.

(56) References Cited

U.S. PATENT DOCUMENTS

| 6,324,087 | B1 | 11/2001 | Pereira |
| 6,538,911 | B1 * | 3/2003 | Allan et al. ................... 365/49.1 |
| 6,611,832 | B1 | 8/2003 | van Lunteren |
| 6,744,652 | B2 | 6/2004 | Srinivasan et al. |
| 6,763,425 | B1 | 7/2004 | Pereira |
| 6,934,796 | B1 | 8/2005 | Pereira et al. |
| 7,143,231 | B1 | 11/2006 | Srinivasan et al. |
| 7,171,439 | B2 | 1/2007 | Honig |
| 7,290,084 | B2 | 10/2007 | Miller et al. |
| 7,346,000 | B1 | 3/2008 | Srinivasan et al. |
| 7,389,377 | B2 | 6/2008 | Gupta |
| 7,426,518 | B2 | 9/2008 | Venkatachary et al. |
| 7,461,200 | B1 | 12/2008 | Birman et al. |
| 7,571,156 | B1 | 8/2009 | Gupta et al. |
| 7,694,068 | B1 | 4/2010 | Rosman |

(Continued)

OTHER PUBLICATIONS

Unpublished U.S. Appl. No. 13/247,810, filed Sep. 28, 2011, entitled "Method and Apparatus for Re-Ordering Ruled for Storage in a Content Search System".

*Primary Examiner* — Kalpit Parikh

(74) *Attorney, Agent, or Firm* — Sterne, Kessler, Goldstein & Fox P.L.L.C.

(57) ABSTRACT

A method and apparatus for comparing a search key with a plurality of rules of an access control list (ACL) stored in a plurality of content addressable memory (CAM) blocks of a content search system are disclosed. The search key is compared with a plurality of covering prefix entries stored in a covering prefix table, wherein a respective covering prefix entry includes first and second common prefix values. The first common prefix value is shared by all of the rules stored in a first of the CAM blocks, and the second common prefix value is shared by all of the rules stored in a second of the CAM blocks. A bitmap associated with a matching covering prefix entry selectively enables a subset of the CAM blocks for comparison with the search key to determine the highest priority matching rule.

25 Claims, 8 Drawing Sheets

(56) References Cited

U.S. PATENT DOCUMENTS

| | | |
|---|---|---|
| 7,836,246 B2 | 11/2010 | Birman et al. |
| 7,904,642 B1 | 3/2011 | Gupta et al. |
| 7,933,282 B1 | 4/2011 | Gupta et al. |
| 7,978,709 B1 | 7/2011 | Venkatachary et al. |
| 8,031,503 B1 | 10/2011 | Gyllenhammer et al. |
| 8,266,373 B1 | 9/2012 | Smith |
| 8,467,213 B1 | 6/2013 | Channabasappa |

* cited by examiner

FIG. 2A

| Source IP Address | Source Port | Destination IP Address | Destination Port | Protocol Code | Checksum |
|---|---|---|---|---|---|
| 201 | 202 | 203 | 204 | 205 | 206 |

| Source IP Address Field | Source Mask Field | Destination IP Address Field | Destination Mask Field | Priority Field | Action Field |
|---|---|---|---|---|---|
| 211 | 212 | 213 | 214 | 215 | 216 |

| IPv4/Z | CAM cell/Mask cell | CAM Entries | | | |
|---|---|---|---|---|---|
| 209.120.0.0/13 | CAM WORD<br>MASK WORD | 1101 0001<br>0000 0000 | 0111 1000<br>0000 0111 | 0000 0000<br>1111 1111 | 0000 0000<br>1111 1111 |

381 —

| Decimal SA entry | Equivalent Binary SA entry |
|---|---|
| SA1=10.0/16 | 00001010 00000000 ******* ******* |
| SA2=10.1/16 | 00001010 00000001 ******* ******* |

15 MSB's in common ⟶ CPV=10.0/15

382 —

| Decimal SA entry | Equivalent Binary SA entry |
|---|---|
| SA6=10.128/14 | 00001010 100000** ******* ******* |
| SA8=10.192/14 | 00001010 110000** ******* ******* |

9 MSB's in common ⟶ CPV=10.128/9

383 —

| Decimal DA entry | Equivalent Binary DA entry |
|---|---|
| DA4=20.0/16 | 00010100 00000000 ******* ******* |
| DA5=20.0/12 | 00010100 0000**** ******* ******* |

12 MSB's in common ⟶ CPV=20.0/12

384 —

| Decimal DA entry | Equivalent Binary DA entry |
|---|---|
| DA7=30.0/14 | 00011110 000000** ******* ******* |
| DA9=30.8/14 | 00011110 000010** ******* ******* |

12 MSB's in common ⟶ CPV=30.0/12

385 —

| Decimal SA entry | Equivalent Binary SA entry |
|---|---|
| SA10=10/8 | 00001010 ******* ******* ******* |

CPV=10/8

386 —

| Decimal SA entry | Equivalent Binary SA entry |
|---|---|
| SK_SA=10.160.0.0 | 00001010 10100000 00000000 00000000 |
| R9_SA=10.160/16 | 00001010 10100000 ******* ******* |
| R10_SA=10/8 | 00001010 ******* ******* ******* |

387 —

| Decimal DA entry | Equivalent Binary DA entry |
|---|---|
| SK_DA=30.8.0.0 | 00011110 00001000 00000000 00000000 |
| R9_DA=30.8/14 | 00011110 000010** ******* ******* |
| R10_DA=* | ******* ******* ******* ******* |

FIG. 3B

METHOD AND APPARATUS FOR REDUCING POWER CONSUMPTION DURING RULE SEARCHES IN A CONTENT SEARCH SYSTEM

CROSS-REFERENCE TO RELATED APPLICATION

This application claims the benefit under 35 USC 119(e) of the commonly owned U.S. Provisional Application No. 61/389,554 entitled "Power Reduction for ACL Lookups in O3 by Filtering on Source and Destination Prefix" filed on Oct. 4, 2010, the entirety of which is incorporated by reference herein.

TECHNICAL FIELD

This disclosure generally relates to the packet classification operations and more specifically to techniques for limiting power consumption of content addressable memories in a content search system.

BACKGROUND OF RELATED ART

Packet classification and application of access control lists (ACLs) are employed by Internet routers to implement a number of advanced Internet services such as policy-based routing, rate-limiting, access control in firewalls, service differentiation, traffic shaping, traffic billing, etc. Each of these services requires the router to classify incoming packets into different classes and then to perform appropriate actions depending upon the packet's correspondence to one or more of the rules in the access control lists. For example, in packet routing applications, an incoming packet is classified to determine whether to forward or filter the packet, where to forward the packet to, what class of service the packet should receive, and/or how much should be charged for transmitting the packet. Sometimes a packet classifier embodies a set of policies or rules that define what actions are to be taken based upon the contents of one or more fields of the packet's header. The packet header, which typically includes source and destination addresses, source and destination port numbers, protocol information, and so on, may match more than one rule. For example, one rule in a firewall application can specify either a "permit" or "deny" action for a given set of source and destination addresses, another rule in the firewall application can specify either a "permit" or "deny" action for a given protocol, and yet another rule in the firewall application can specify either a "permit" or "deny" action for a particular source IP address and protocol.

Many packet classification systems employ content addressable memory (CAM) devices to store the rules of various ACLs. During packet classification look-up operations, selected information from an incoming packet's header is used to form a search key that is simultaneously compared with the rules stored in the CAM device, thereby allowing packet classification operations to be performed at very high speeds. However, although capable of very fast searching speeds, CAM devices are relatively large, expensive, and power-hungry. Thus, there is a need to reduce power consumption of CAM devices, for example, deployed in packet classification operations.

BRIEF DESCRIPTION OF THE DRAWINGS

The present embodiments are illustrated by way of example and are not intended to be limited by the figures of the accompanying drawings.

FIG. 2A shows a data structure for a packet in accordance with some embodiments.

FIG. 2B shows a data structure for a rule in accordance with some embodiments.

FIG. 2C illustrates the storage an IP address having a prefix length in a row of a content addressable memory (CAM) array.

FIG. 3B illustrates the formation of exemplary covering prefix values from the rules of the ACL of FIG. 3A in accordance with some embodiments.

Like reference numerals refer to corresponding parts throughout the drawing figures.

DETAILED DESCRIPTION

Figure 1:
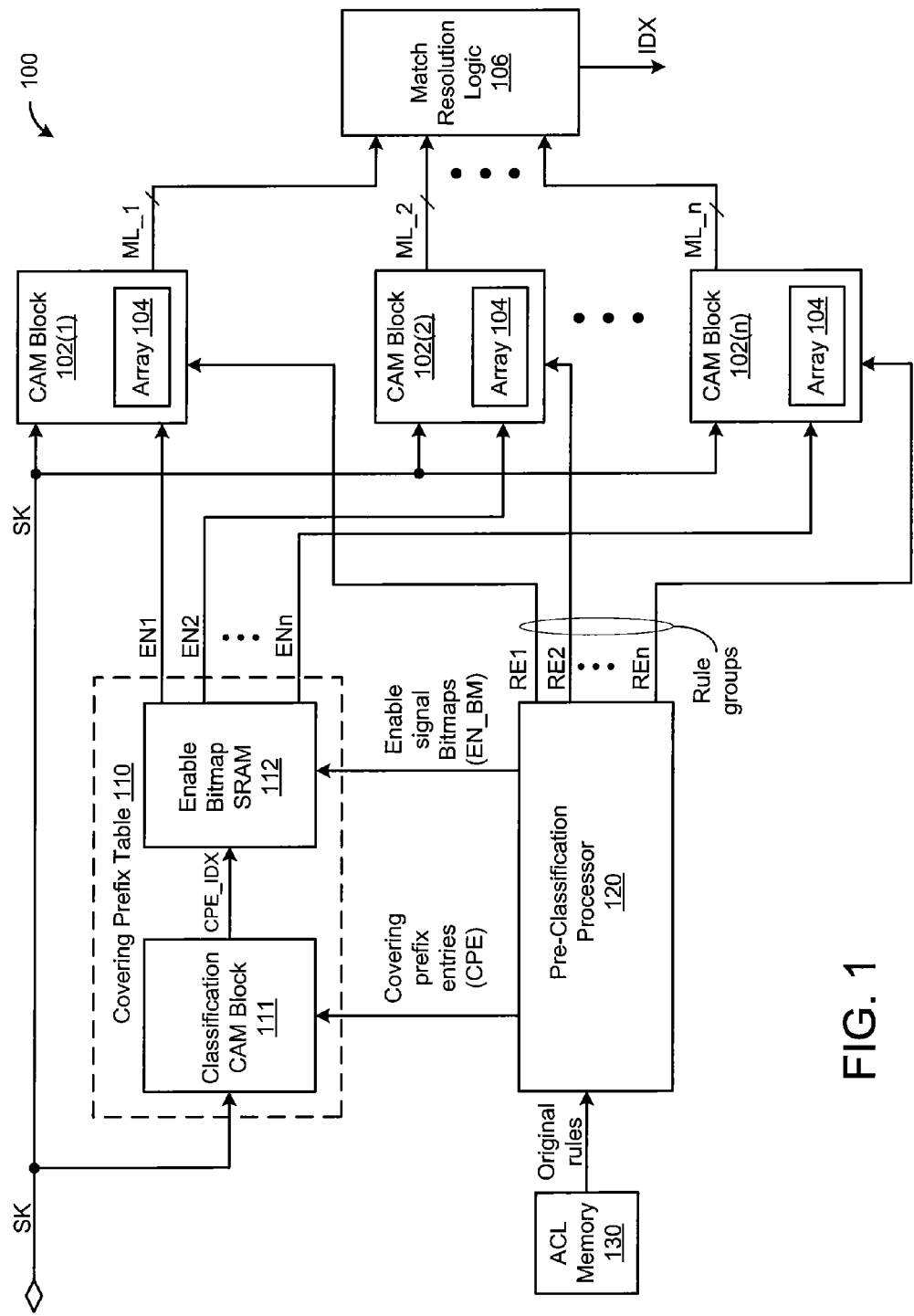
FIG. 1 shows a content search system in accordance with some embodiments.

Embodiments of the present disclosure are discussed below in the context of a CAM-based content search system for illustrative purposes only. It is to be understood that present embodiments are equally applicable to other content search systems and/or CAM structures having other configurations of any suitable type of content addressable memory cells. Further, architectural configurations of the present disclosure may be implemented using other types of memory blocks such as, for instance, RAM, Flash memory, and EEPROM. The interconnection between circuit elements or blocks may be shown as buses or as single signal lines, where each of the buses may alternatively be a single signal line, and each of the single signal lines may alternatively be a bus. In addition, the logic levels assigned to various signals in the description below are arbitrary, and therefore may be modified (e.g., reversed polarity) as desired. Accordingly, the embodiments described herein are not to be construed as limited to specific examples described herein but rather includes within its scope all embodiments defined by the appended claims.

For purposes of discussion herein, an access control list (ACL) contains a set of rules, and each rule is identified by a rule number and includes a source address field, a destination address field, a source port field, a destination port field, a protocol field, and an action field. The source address field contains a source address (SA) that can be compared with the source address of incoming packets, and the destination address field contains a destination address (DA) that can be compared with the destination address of incoming packets. Together, the SA and DA represent the Layer-3 (L3) or network layer addresses. The source and destination port fields contain source and destination port entries that are compared with the source and destination address port values of incoming packets, which together represent the Layer-4 (L4) or transport layer addresses. For example, the source and destination port addresses are typically represented as a single decimal number (e.g., port 80).

The protocol field contains a protocol value that is compared with the protocol of incoming packets. For example, the protocol can identify the transmission control protocol (TCP), the user datagram protocol (UDP), the Internet control message protocol (ICMP), and so on. The action field stores an action to be taken for packets matching the rule. For example, the action can "permit" the packet to be forwarded or to "deny" the packet from being forwarded. Of course, each rule can contain additional fields such as, for example, a class code and/or other information that can be matched with information containing in an incoming packets header.

In classless inter-domain domain routing (CIDR) addressing systems, the source and destination addresses are typically represented as series of four decimal numbers separated by periods and a prefix length /Z that indicates the number of bits of the address that form the network portion of the address. The prefix length can also indicate the number of most-significant bits (MSB's) of the address value that are unmasked during search operations with a search key (e.g., in packet classification look-up operations and next-hop forwarding look-up operations). Further, as used herein, longer prefix lengths are considered to be more specific than shorter prefix lengths. For example, the address value 192.2.0.0/16 has a longer prefix than does the address value 192.0.0.0/8, and thus the address value 192.2.0.0/16 is more specific than the address value 192.0.0.0/8. Conversely, the address value 192.2.0.0/8 is more general than the address value 192.2.0.0/16 because 192.2.0.0/8 has a shorter prefix than does 192.0.0.0/16.

As mentioned above, larger and more complex access control lists resulting from increasing Internet traffic require CAM devices employed as packet classifiers to include increasing numbers of larger CAM blocks or arrays, which in turn undesirably increases power consumption. Thus, in accordance with the present embodiments, a method and apparatus are disclosed that allow the rules of one or more ACLs to be partitioned, grouped, and then stored in a CAM-based packet classification device in a manner that allows a minimum number (e.g., a selected subset) of the CAM blocks to be enabled for packet classification search operations, thereby advantageously reducing power consumption during search operations.

More specifically, a content search system is disclosed that includes a plurality of CAM blocks, a covering prefix table, and a pre-classification processor. The pre-classification processor includes an input to receive a number of rules of an ACL table, and is configured to selectively partition the rules into groups of rule entries that can be stored in corresponding CAM blocks. For some embodiments, the pre-classification processor analyzes the rules of the ACL and generates a number of covering prefix values, each of which covers a corresponding subset of the rule entries of the ACL to be stored in the content search system. The covering prefix values are assigned to various CAM blocks, and then the rule entries are stored in corresponding CAM blocks according to the covering prefix values, for example, so that within each CAM block, all rule entries stored therein are covered by the assigned covering prefix value. The pre-classification processor combines the covering prefix values into a number of different covering prefix entries, and for each covering prefix entry generates an associated enable signal bitmap that indicates which CAM blocks store rule entries covered by the corresponding covering prefix entry. Then, pairs of covering prefix entries and enable signal bitmaps are stored in the covering prefix table.

Thereafter, during a search operation with a search key, selected fields of the search key (e.g., SA and DA values) are compared with the covering prefix entries stored in the covering prefix table, and if there is match, then the enable signal bitmap associated with the matching covering prefix entry is used to selectively enable a corresponding subset of the CAM blocks. The search key is then provided to the enabled CAM blocks and compared with the rule entries stored therein to determine whether a match condition exists. If there is a match condition, resolution logic combines the match results to determine rule of the ACL matched the search key, and then appropriate an action is taken (e.g., either permit or deny the packet). By selectively enabling a minimum number of the CAM blocks for search operations with the search key, power consumption of the content search system is reduced.

FIG. 1 shows a content search system 100 in accordance with some embodiments. The content search system 100 is shown to include a plurality of CAM blocks 102(1)-102(n), match resolution logic 106, a covering prefix table 110, a pre-classification processor 120, and an ACL memory 130. Other signals provided to content search system 100 include clock signals (not shown for simplicity), one or more instructions from an instruction decoder (not shown for simplicity), and other control signals. Other well-known signals that can be provided to the CAM blocks 102, such as reset signals, are not shown for simplicity.

Each CAM block 102 includes a CAM array 104 having a plurality of rows and columns of CAM cells (not shown in FIG. 1 for simplicity) for storing searchable data therein. CAM arrays 104 can be any suitable type of CAM array including, for example, synchronous or asynchronous CAM arrays, and the CAM cells can be any suitable type of CAM cells including, for example, binary, ternary, and/or quaternary CAM cells. More specifically, each array 104 includes a plurality of CAM cells organized in a number of rows and columns. Each row of CAM cells, which can be used to store a CAM word, is coupled to a corresponding match line that indicates match results for the row. Each row of CAM cells can also include one or more valid bits indicative of whether valid data is stored in the row. Each column of CAM cells is typically coupled to one or more data lines or data line pairs that can be used to drive data into a selected CAM row during write operations and/or for providing a search key to the CAM rows during search (e.g., compare) operations. Although not shown for simplicity, each CAM block 102 can also include match logic to generate a match flag indicative of match conditions therein, and can also include address decoders, read and write writes, a comparand register, and other well-known elements.

The match lines of each CAM array 104 are coupled to resolution logic 106. For example, the array 104 of first CAM block 102(1) is coupled to resolution logic 106 via a first set of match lines ML_1, the array 104 of second CAM block 102(2) is coupled to resolution logic 106 via a second set of match lines ML_2, and so on. For simplicity, the match lines ML from each of CAM blocks 102(1)-102(n) are represented collectively in FIG. 1. During search operations, the search key (e.g., the comparand word) is provided to CAM arrays 104 and compared with the CAM words stored therein. For each CAM word that matches the search key, a corresponding match line is asserted to indicate the match condition, and resolution logic 106 determines the match address or index of the highest priority matching (HPM) entry in all of the CAM blocks 102(1)-102(n).

More specifically, for some embodiments, resolution logic 106 includes a priority encoder and associated priority logic, receives match results and associated priority information (e.g., rule numbers) from each of the CAM blocks 102(1)-102(n), and determines which of the matching entries indicated by CAM blocks 102(1)-102(n) is associated with the highest priority rule. For some embodiments, resolution logic 106 can include a memory element such as a RAM that stores priority information for each entry in the arrays 104 of CAM blocks 102(1)-102(n). Accordingly, resolution logic 106 can determine the highest-priority matching entry using priority information associated with the matching entries, rather than relying upon the matching entries' physical locations in the CAM arrays 104 (e.g., as is typically done using conventional priority encoder circuits). In this manner, rule entries can be stored in CAM blocks 102(1)-102(n) in any order, thereby allowing the rule entries to be grouped together according to commonalities in one or more fields (e.g., source address, destination address, port number, and so on), as discussed in more detail below. For one embodiment, resolution logic 106 can be of the type disclosed in commonly-owned U.S. Pat. No. 7,143,231 entitled "Method and Apparatus for Performing Packet Classification for Policy Based Packet Routing", the entirety of which is incorporated by reference herein.

For other embodiments, resolution logic 106 can be a hierarchical priority encoder that includes a number of first-level priority encoder circuits that each determines the HPM entry in an associated CAM block 102, and includes a second-level priority encoder circuit that determines which of CAM block 102(1)-102(n) has the HPM entry.

Further, the array 104 within each of CAM blocks 102(1)-102(n) can be of any suitable size, and in some embodiments, the CAM blocks 102(1)-102(n) can be of different sizes. In one exemplary embodiment, each CAM array 104 includes 1 k (1024) rows of CAM cells for storing searchable data therein.

For purposes of discussion herein, a first CAM block (e.g., CAM block 102(1)) in the content search system 100 is designated as the highest priority block, the second CAM block 102(2) is designated as the next highest priority block, and so on, and the last CAM block 102(n) is designated as the lowest priority block. In some embodiments priority can be reversed or otherwise modified. Thus, for exemplary embodiments in which each CAM block 102 includes 1 k row of CAM cells, the highest priority CAM block 102(1) can include the lowest CAM addresses (i.e., CAM addresses 0 to k−1), the next highest priority CAM block 102(2) can include the next lowest CAM addresses (i.e., CAM addresses k to 2 k−1), and so on, and the lowest priority CAM block 102(n) can include the highest CAM addresses (i.e., CAM addresses (n−1)k to nk−1).

The covering prefix table 110 is shown to include a classification CAM block 111 and an enable bitmap SRAM device 112. Classification CAM block 111, which for some embodiments is architecturally similar to CAM blocks 102(1)-102(n), includes a CAM array (not shown for simplicity) having a plurality of rows of CAM cells, and includes a priority encoder (not shown for simplicity) to generate an index value (CPE_IDX) that is provided as a look-up value to SRAM 112. Thus, each row in the array of classification CAM block 111 is associated with a corresponding row in SRAM 112. More specifically, for the exemplary embodiment of FIG. 1, each row in the classification CAM array can store a covering prefix entry formed by pre-classification processor 120, and the corresponding row in SRAM 112 stores an associated enable signal bitmap (EN_BM) that can be provided as enable signals (EN1-ENn) to selectively enable respective CAM blocks 102(1)-102(n) for search operations, as described in more detail below.

The ACL memory 130, which can be any suitable memory device, stores an access control list (ACL) table in an original form as provided by one or more network system administrators. As mentioned above, the ACL table includes a plurality of rules that, when compared with selected fields of a packet header, can be used to determine which actions (e.g., permit access or deny access) to take for the corresponding packet.

For example, FIG. 2A shows an exemplary packet header 200 typically used in Internet Protocol (IP) routing applications. As shown, packet header 200 includes a source address (SA) 201, a source port number 202, a destination address (DA) 203, a destination port number 204, a protocol value 205, and a checksum 206. In exemplary embodiments, the values in the aforementioned fields are commonly referred to in decimal form and stored in the packet header using binary values. For example, an IP address represented (as dotted quads) in decimal form as "192.0.0.0" can be expressed in binary form as "11000000.00000000.00000000.00000000".

FIG. 2B shows an exemplary data structure 210 for a rule that can be included within the ACL table stored with the ACL memory 130. As shown, data structure 210 includes a source address field 211, a source mask field 212, a destination address field 213, a destination mask field 214, a priority field 215, and an action field 216. The fields 211-215 can be combined in various ways to compose a rule.

As mentioned above, the source and destination addresses contained within a rule of an ACL are typically represented as series of four decimal numbers separated by periods and a prefix length /Z that indicates the number of bits of the address that form the network portion of the address. For example, the 32-bit address "209.120.0.0/13" has a prefix length of 13, thereby indicating that the first 13 bits of the binary address are typically unmasked during search operations. When such an address is stored in a ternary CAM array such as array 104 of FIG. 1, the address is typically stored as a binary CAM word in the data storage elements of a row of CAM cells, and the prefix length is typically stored as a binary mask word in the mask storage elements of the row of CAM cell. For example, FIG. 2C depicts storage of the 32-bit address "209.120.0.0/13" in a row 220 of CAM cells, where the logic low values (e.g., "0") of the mask bits indicate that corresponding address bits are not to be masked during search operations, and the logic high values (e.g., "1") of the mask bits indicate that corresponding address bits are to be masked during search operations. In this manner, by allowing only the first 13 bits (e.g., the 13 MSB's) of the address to participate in search operations, the CAM row 220 stores the CIDR address "209.120.0.0/13".

Referring again to FIG. 1, pre-classification processor 120 includes an input coupled to ACL memory 130, and includes first outputs coupled to classification CAM block 111, second outputs coupled to SRAM 112, and third outputs coupled to CAM blocks 102(1)-102(n). In accordance with the present embodiments, pre-classification processor 120 analyzes the various fields of the rules of the ACL table (e.g., as provided by ACL memory 130) for commonalities to derive a number of common prefix values for the rules. The pre-classification processor 120 then uses the derived common prefix values to re-order the rules into a number of rule groups, wherein the rules within each rule group share one of the derived common prefix values. For exemplary embodiments described herein, the pre-classification processor 120 derives common prefix values for both the source address (SA) and destination address (DA) fields of the ACL table. For other embodiments, the pre-classification processor 120 can derive common prefix values for other fields such as, for example, the source port number, the destination port number, and/or the protocol value. Then, the pre-classification processor 120 assigns the rule group to a selected CAM block(s) 102, selectively combines pairs of SA and DA common prefix values to form a number of covering prefix entries (CPE), and constructs an enable signal bitmap for each CPE that indicates which rule groups are associated with the CPE (and thus which CAM blocks 102 store the associated rule groups).

Thereafter, the pre-classification processor 120 populates the content search system 100 with the modified ACL entries by storing the rule entries (RE) of each rule group in the corresponding selected CAM block(s) 102, storing the covering prefix entries (CPE) in selected rows of the classification CAM block 111, and then storing corresponding enable signal bitmaps into associated rows of SRAM 112. For some embodiments, the enable signal bitmaps stored in SRAM 112 are indicative of which rule groups are stored in which CAM blocks 102, and can be used to selectively enable a subset of the CAM blocks 102 during search operations (e.g., during a packet classification look-up operations). In this manner, power consumption of the content search system 100 can be reduced by enabling only those CAM blocks 102 that store rules that can possibly match the search key provided during the packet classification search operation. Further, as explained in more detail below, a maximum reduction in power consumption can be achieved by grouping the rules together for storage in corresponding CAM blocks 102 in a manner that enables a minimum number of the CAM blocks 102 at a time for each search operation.

For some embodiments, the priority order of rules within a rule group is preserved in the corresponding CAM block 102 (e.g., the rules within each rule group are stored in the corresponding CAM block 102 according to priority). For some embodiments, each rule group is stored, in a single corresponding CAM block 102. However, for other embodiments, multiple rule groups can be stored in the same CAM block 102, and/or some rule groups can be stored across multiple CAM blocks (e.g., depending upon the size of CAM blocks 102 and the size of each rule group).

For exemplary embodiments, pre-classification processor 120 and ACL memory 130 are formed as part of content search system 100 (e.g., on the same circuit or chip), as depicted in FIG. 1. For other embodiments, pre-classification processor 120 and ACL table 130 are separate circuits and/or are formed on separate chips from content search system 100. For example, for such other embodiments, the re-ordered rule groups and enable bitmaps generated by pre-classification processor 120 can be provided to the covering prefix table 110 and CAM blocks 102 via a suitable connection path, thereby allowing the re-ordering and grouping of ACL rules to be performed using other computing platforms.

During search operations (e.g., packet classification look-up operations) to determine whether a packet matches one or more of the ACL rules, a search key is formed using a selected number of fields from the packet's header. The search key (SK) is provided to the classification CAM block 111 and compared with the covering prefix entries (CPE) stored therein. If the search key matches one or more of the covering prefix entries, the classification CAM block 111 generates an index of the CPE stored in the highest-priority matching location. The index is used to select the corresponding enable signal bitmap stored in an associated location in the SRAM 112. Then, the selected enable signal bitmap is provided as enable signals EN1-ENn to selectively enable respective CAM blocks 102(1)-102(n) for a compare operation between the search key and the rule entries stored in the selectively enabled CAM blocks 102. In this manner, only the CAM blocks 102(1)-102(n) that store rule entries that could possibly match the search key are enabled (while all other CAM blocks 102 are disabled), thereby reducing power consumption by enabling a minimum number of CAM blocks to participate in the search operation. Further, in accordance with present embodiments, the covering prefix entries are generated, and the rule groups are stored in corresponding CAM blocks 102, such that during a search operation between a search key and rules stored in the CAM blocks 102, all rules that could possibly match the search key are stored in CAM blocks 102 that are enabled for the search operation by the covering prefix table 110, and conversely, all rules that are stored in non-enabled CAM blocks 102 could not match the search key. In this manner, the present embodiments ensure correct match results while reducing power consumption.

A more detailed operation for re-ordering the rules of an ACL for storage in content search system 100 according to present embodiments, and for performing a search operation using the re-ordered rules stored therein, are described below with respect to FIGS. 3A-3C. First referring to FIG. 3A, an exemplary original ACL 310 is depicted as including 10 individual rules (R1-R10). Each of rules R1-R10 includes a source address (SA) value, a destination address (DA) value, a source port (SP) number, and a destination port (DP) number, where * indicates a wildcard. For example, rule R1 includes a source address SA1=10.0/16, a destination address DA1=*, a source port SP1=80, and a destination port DP1=*, and rule R2 includes SA2=10.1/16, a destination address DA2=*, a source port SP2=*, and a destination port DP1=*. Thus, SA1 has a prefix length PL1=16, and SA2 also has a prefix length PL2=16. The rules of original ACL table 310 are ordered according to their priorities, where the highest priority rule R1 is stored in the location having the lowest numerical address and the lowest priority rule R10 is stored in the location having the highest numerical address.

Next, the rules R1-R10 are analyzed to generate a number of common prefix values for the rules, which are also referred to herein as "covering prefixes." Each covering prefix is the most specific prefix value that is shared by a selected group of different rules. For the exemplary embodiments described herein, covering prefixes are generated for both the source address values and the destination address values of the rules R1-R10 of the ACL 310. More specifically, to create covering prefixes for the SA values, the SA values of all the rules are analyzed to determine which groups of SA values share the most specific (e.g., the longest) prefix, and to create covering prefixes for the DA values, the DA values of all the rules are analyzed to determine which groups of DA values share the most specific (e.g., the longest) prefix.

For one SA example, a first SA covering prefix value SA_CPV1 of 10.0/15 can be generated to cover the SA1=10.0/16 of rule R1 and the SA2=10.1/16 of rule R2 because the 15 most-significant bits (MSB's) of SA1 and SA2 are the same, as depicted by table 381 in FIG. 3B. For another SA example, a second SA covering prefix value SA_CPV2 of 10.128/9 can be generated to cover the SA6=10.128/14 of rule R6 and the SA8=10.192/14 of rule R8 because the 9 most-significant bits (MSB's) of SA6 and SA8 are the same, as depicted by table 382 in FIG. 3B. For one DA example, a first DA covering prefix value DA_CPV1 of 20.0/12 can be generated to cover the DA4=20.0/16 of rule R4 and the DA5=20.0/12 of rule R5 because the 12 most-significant bits (MSB's) of DA4 and DA5 are the same, as depicted by table 383 in FIG. 3B. For another DA example, a second DA covering prefix value DA_CPV2 of 30.0/12 can be generated to cover the DA7=30.0/14 of rule R7 and the DA9=30.8/14 of rule R9 because the 12 most-significant bits (MSB's) of DA7 and DA9 are the same, as depicted by table 384 in FIG. 3B.

For SA values and DA values that do not share a common prefix value with other SA and DA values, respectively, or whose most common prefix value is too general (e.g., includes many wildcard values *), the SA values and/or DA values can be used as covering prefix values. For example, note that the SA for rule R10, SA10=10/8, does not share the SA_CPV1=10.0/15 because only the first 8 bits of SA10 are unmasked, and thus the SA entry is used as its own covering prefix value CPV=10/8, as depicted by table 385 in FIG. 3B. For alternate embodiments, a more general covering prefix value of 10/8 could be used to cover not only SA10=10/8 but also SA1=10.0/16 of rule R1 and SA2=10.1/16 of rule R2. However, having a more specific covering prefix value is preferable to having a more general covering prefix value because the creation of more specific covering prefix values increases the number (and granularity) of rule groups and therefore can allow for greater numbers of CAM blocks 102 to be disabled during search operations, which in turn achieves greater reductions in power consumption. Further, an additional DA covering prefix value of CPV=* is generated to cover all of the wildcard DA values in the original rules table 310.

After the SA and DA covering prefix values are generated, each of the SA and DA covering prefix values are assigned to a corresponding one (or more) of CAM blocks 102(1)-102(n). For example, referring again to FIG. 3A, the SA_CPV1=10.0/15 is assigned to the first CAM block 102(1), the SA_CPV2=10.128/9 is assigned to the second CAM block 102(2), the DA_CPV1=20.0/12 is assigned to the third CAM block 102(3), the DA_CPV2=30.0/12 is assigned to the fourth CAM block 102(4), and the wildcard entry * is assigned to the fifth CAM block 102(5).

Then, for each one of CAM blocks 102(1)-102(n) having an assigned covering prefix value, the rule entries of the original ACL that are covered by the assigned covering prefix value are stored in the CAM block. For example, rules R1 and R2 are stored in the first CAM block 102(1) having an SA covering prefix value of 10.0/15 (e.g., because the covering prefix value 10.0/15 covers 10.0/16 of R1 and 10.1/16 of R2, as described above). Similarly, rules R6 and R8 are stored in the second CAM block 102(2) having an SA covering prefix value of 10.128/9, rules R4 and R5 are stored in the third CAM block 102(3) having a covering prefix value of 20.0/12, rules R7 and R9 are stored in the fourth CAM block 102(4) having a DA covering prefix value of 30.0/12, and the remaining rules R3 and R10 are stored in the fifth CAM block 102(5) having a DA covering prefix value of *. Thus, the CAM blocks 102 can be grouped into a first set (e.g., blocks 102(1)-102(2)) that stores groups of rules sharing a common source address prefix value, into a second set (e.g., blocks 102(3)-102(4)) that stores groups of rules sharing a common destination address prefix value, and into a third set (e.g., block 102(5)) that stores the remaining rules.

Figure 3A:
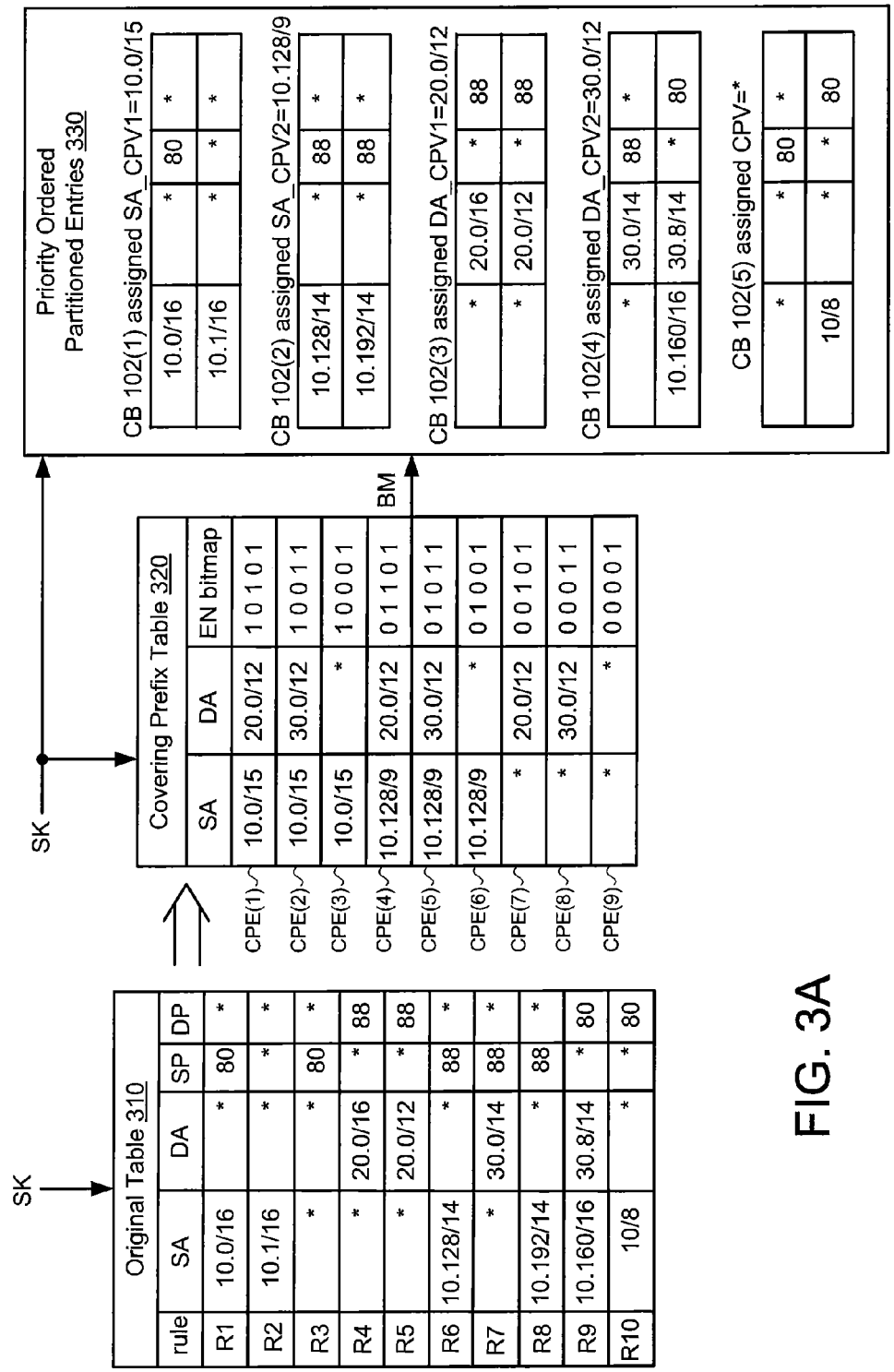
FIG. 3A illustrates the re-ordering of a number of rules of an ACL into a plurality of rule groups and the storage of the rule groups into corresponding CAM blocks of the search system of FIG. 1 in accordance with some embodiments.

After each of the rules R1-R10 of the original ACL 310 has been stored in a corresponding one of the CAM blocks 102, pairs of SA covering prefix values and DA covering prefix values are selectively grouped together to form a number of covering prefix entries (CPE), and then stored in a covering prefix table 320, as depicted in FIG. 3A. Thus, for some embodiments, each covering prefix entry includes one of the SA covering prefix values and one of the DA covering prefix values, and multiple covering prefix entries can share the same SA covering prefix value or the same DA covering prefix value. More specifically, the covering prefix values are grouped together to form the CPE's in a manner that ensures that each combination of SA and DA values contained in the original rules is represented in the covering prefix table 320.

For example, the first 3 CPE's stored in covering prefix table 320 each contain the first source address covering prefix value SA_CPV1=10.0/15. More specifically, the first CPE includes SA_CPV1=10.0/15 and DA_CPV1=20.0/12, the second CPE includes SA_CPV1=10.0/15 and DA_CPV2=30.0/12, and the third CPE includes SA_CPV1=10.0/15 and the wildcard DA_CPV=*. In this manner, if an incoming search key contains a source address that is covered by SA_CPV1=10.0/15, then all possible values of the destination address contained in the search key will match at least one of the CPE's stored in the covering prefix table 320. Accordingly, during search operations, all packet header search keys that match one or more rule entries within a particular CAM block 102 will have either an SA portion or a DA portion that is covered by the covering prefix value assigned to the CAM block, as explained in more detail below.

Then, for each covering prefix entry, an enable signal bitmap is created that indicates which of CAM blocks 102 are to be enabled for searching if a search key contains source and destination address portions that match respective SA and DA covering prefix values of the covering prefix entry. The enable signal bitmaps are stored in corresponding locations in the covering prefix table 320. For the example depicted in FIG. 3B, the enable signal bitmaps include 5 bits in the format $B_1B_2B_3B_4B_5$, where each of bits $B_1B_2B_3B_4B_5$ selectively enables a corresponding one of CAM blocks 102(1)-102(5), respectively, for a classification search operation. For exemplary embodiments described herein, a logic high bit $B_x=1$ enables corresponding CAM block 102(x), and a logic low bit $B_x=0$ disables corresponding CAM block 102(x).

The enable signal bitmaps associated with the CPEs stored in table 320 are typically different from one another so that different subsets of the CAM blocks 102 are enabled in response to different search keys. For example, the first 3 CPE's stored in covering prefix table 320, which as discussed above each contain SA_CPV1=10.0/15, contain different enable signal bitmaps that enable different combinations of the CAM blocks 102(1)-102(5) depending upon the value of the destination address portion of the incoming search key. In this manner, if an incoming search key contains a source address that is covered by SA_CPV1=10.0/15, then all possible values of the destination address contained in the search key will match at least one of the 3 corresponding CPE's stored in the covering prefix table 320.

More specifically, the first CPE includes SA_CPV1=10.0/15 and DA_CPV1=20.0/12, and is therefore associated with an enable signal bitmap BM1=10101 that enables the first, third, and fifth CAM blocks 102(1), 102(2), and 102(5), respectively, because the first CAM block 102(1) is assigned the SA_CPV1=10.0/15, the third CAM block 102(3) is assigned the DA_CPV1=20.0/12, and the fifth CAM block 102(5) is assigned *. Further, the second CPE includes SA_CPV1=10.0/15 and DA_CPV2=30.0/12, and is therefore associated with an enable signal bitmap BM2=10011 that enables the first, fourth, and fifth CAM blocks 102(1), 102(4), and 102(5), respectively, because the first CAM block 102(1) is assigned the SA_CPV1=10.0/15, the fourth CAM block 102(4) is assigned the DA_CPV2=30.0/12, and the fifth CAM block 102(5) is assigned *. Similarly, the third CPE includes SA_CPV1=10.0/15 and DA_CPV=*, and is therefore associated with an enable signal bitmap BM3=10001 that enables the first and fifth CAM blocks 102(1) and 102(5), respectively, because the first CAM block 102(1) is assigned the SA_CPV1=10.0/15 and the fifth CAM block 102(5) is assigned *.

Note that the covering prefix table 320 depicted in FIG. 3A is an exemplary embodiment of covering prefix table 110 of FIG. 1. Thus, for some embodiments, the covering prefix entries (CPE) having SA and DA portions are stored in rows of classification CAM block 111, and the associated enable signal bitmaps (EN_BM) are stored in corresponding rows of SRAM 112. For example, referring to both FIG. 1 and FIG. 3A, the first CPE1 having SA=10.0/15 and DA=20.0/12 is stored in the first row of classification CAM block 111, and the associated bitmap BM1=10101 is stored in the first row of SRAM 112; the second CPE2 having SA=10.0/15 and DA=30.0/12 is stored in the second row of classification CAM block 111, and the associated bitmap BM2=10011 is stored in the second row of SRAM 112; and so on.

Further, in accordance with the present embodiments, covering prefix table 320 has significantly fewer entries than original ACL table 310, which in turn can save memory resources. Thus, although the example of FIG. 3A depicts original ACL table 310 as having 10 entries and depicts covering prefix table 320 as having 9 entries, for actual embodiments, covering prefix table 320 can typically have one or more orders of magnitude fewer entries than original ACL table 310.

An exemplary search operation between a search key SK1 having an SA portion SK1_SA=10.160.0.0, a DA portion SK1_DA=30.8.0.0, a source port portion SK1_SP=80, and a destination port portion SK1_DP=80 is described below with respect to FIG. 3C. However, before continuing with this exemplary search operation using covering prefix values and their associated enable signal bitmaps to selectively enable a minimum number of CAM blocks 102 in accordance with present embodiments, note that SK1 matches rules R3, R9, and R10 of the original ACL stored in the ACL table 310, and that rule R3 is selected as the highest priority match (HPM) because R3 is stored at a lower address location in original ACL table 310 than the other matching rules R9 and R10. Note that SK1 matches rule 3 because both the SA and DA fields of rule 3 are wildcards, and the SP=80 of SK1 matches the SP=80 of rule 3. Further, note that SK1 matches rules R9 and R10 because SK1_SA=10.160.0.0 matches the SA=10.160/16 of R9 and SA=10/8 of R10 as depicted in table 386 of FIG. 3B, and because SK1_DA=30.8.0.0 matches the DA=30.8/14 of R9 and the DA=* of R10 as depicted in table 387 of FIG. 3B. Thus, search operations between SK1 and rules R1-R10 performed using the covering prefix table 320 and partitioned CAM entries 330 should indicate rule R3 as the highest-priority matching rule.

Figure 3C:
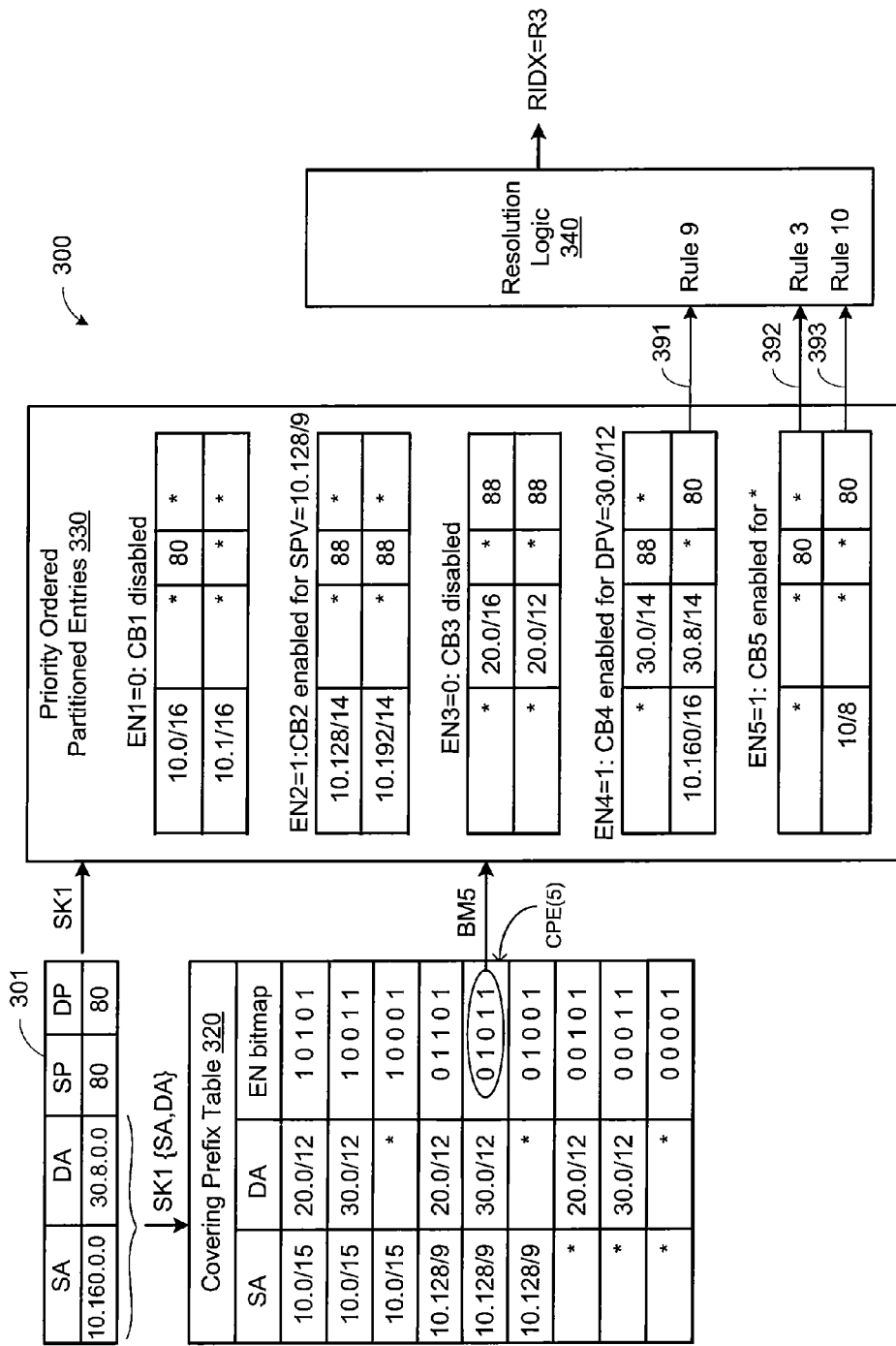
FIG. 3C illustrates an exemplary search operation between a search key and the rules groups the grouping of a number of rules of an ACL into rule groups and the storage of the rule groups into corresponding CAM blocks of the search system of FIG. 1 in accordance with some embodiments.

Now referring to FIG. 1 and FIG. 3C, during search operations in accordance with the present embodiments, the SA and DA portions of SK1 are extracted and provided as a search key to the classification CAM block 111 (which is loaded with the covering prefix entries shown in covering prefix table 320 of FIG. 3C, as described above), and then compared with all of the covering prefix entries stored therein. The value of SK1{SA,DA} matches CPE(5) in covering prefix table 110/320 because SK1_SA=10.160.0.0 matches SA_CPV2=10.128/9 and SK1_DA=30.8.0.0 matches the DA_CPV5=30.0/12. In response thereto, classification CAM block 111 provides a CPE index value of CPE_IDX=5 to SRAM 112, which in turn forwards the associated enable signal bitmap BM5=01011 to CAM blocks 102(1)-102(5). In response to the bitmap BM5 provided by the covering prefix table 110/320, CAM blocks 102(1) and 102(3) are disabled, and CAM blocks 102(2), 102(4), and 102(5) are enabled for a search operation with the entire search key SK1. By disabling CAM blocks 102(1) and 102(3) for the search operation, power consumption is advantageously reduced.

More specifically, the four fields (e.g., SA, DA, SP, and DP) of SK1 are compared with corresponding fields of all rule entries stored in the enabled CAM blocks 102(2), 102(4), and 102(5), while the other CAM blocks 102(1) and 102(3) are disabled. Here, the search key SK1 matches the second entry in fourth CAM block 102(4), matches the first entry in fifth CAM block 102(5), and matches the second entry in fifth CAM block 102(5), as indicated by respective arrows 391, 392, and 393 in FIG. 3C. In response thereto, CAM blocks 102(4) and 102(5) each generate HPM indices corresponding to their matching rule entries, and the indices (as represented by arrows 391, 392, and 393, respectively) are provided to resolution logic 340. In response thereto, resolution logic 340 uses the HPM indices generated by CAM blocks 102(4) and 102(5), and priority values (e.g., rule numbers) associated with the matching entries, to generate a rule index (RIDX) indicating rule R3 as the HPM rule, as depicted in FIG. 3C. In this manner, resolution logic 340 uses the HPM indices provided by the matching CAM blocks 102(4)-102(5), along with the matching entries' priority information (which can be stored in a suitable memory within and/or associated with resolution logic 340), to construct the rule index identifying rule R3 as the HPM rule.

Figure 4A:
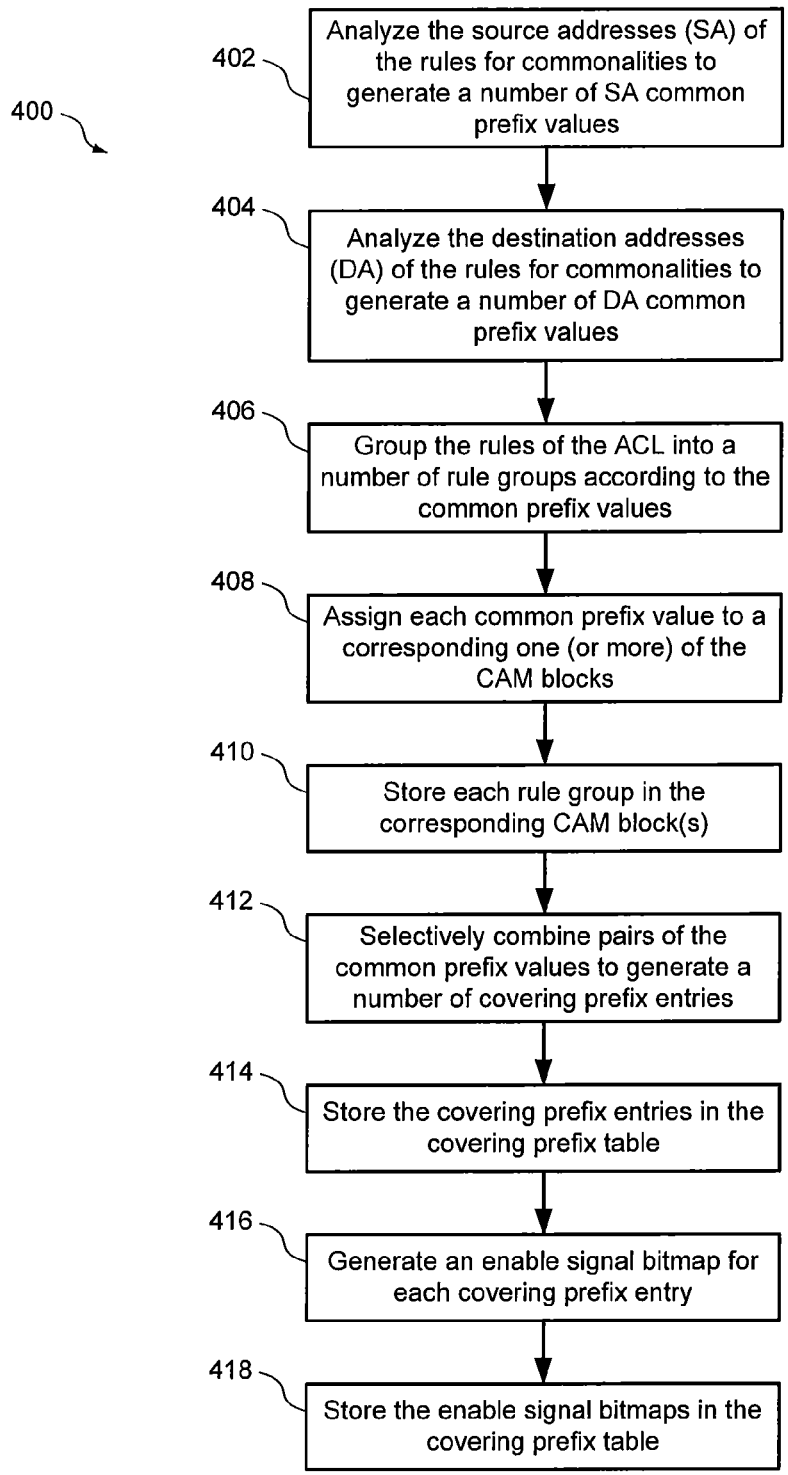
FIG. 4A is an illustrative flow chart depicting an exemplary operation for re-ordering rules of an ACL for storage in the content search system of FIG. 1.

FIG. 4A is an illustrative flow chart 400 depicting an exemplary operation for re-ordering rules of an ACL for storage in the content search system 100 of FIG. 1. Referring also to FIGS. 1 and 3A-3B, the pre-classification processor 120 analyzes the source addresses (SA) of the rules for commonalities to generate a number of SA common prefix values (402), and then analyzes the destination addresses (DA) of the rules for commonalities to generate a number of DA common prefix values (404). Next, the pre-classification processor 120 groups the rules of the ACL into a number of rule groups according to the common prefix values (406), and assigns each common prefix value to a corresponding one (or more) of the CAM blocks 102 (408). As discussed above, the rules within each rule group share the common prefix value associated with the group and assigned to the corresponding CAM block 102. Next, each rule group is stored in the corresponding CAM block(s) 102 (410). Then, the pre-classification processor 120 selectively combines pairs of the common prefix values to generate a number of covering prefix entries (412), and stores the covering prefix entries in the covering prefix table 110 (414). Finally, the pre-classification processor 120 generates an enable signal bitmap for each covering prefix entry (416), and stores the enable signal bitmaps in the covering prefix table 110 (418).

Figure 4B:
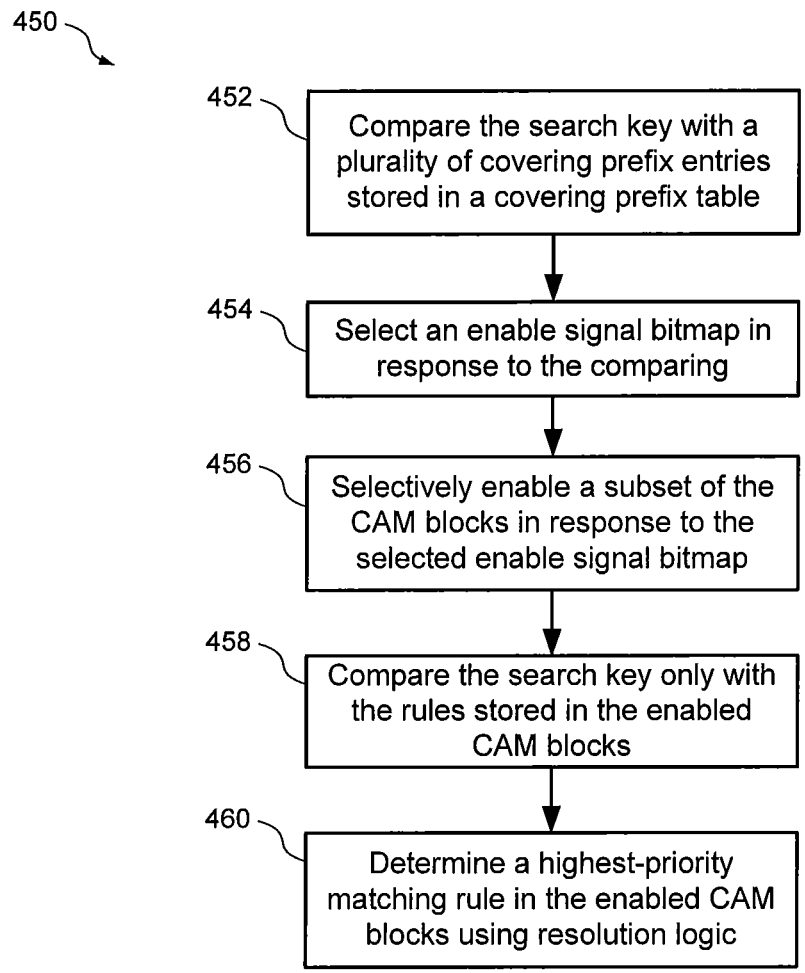
FIG. 4B is an illustrative flow chart depicting an exemplary operation for comparing a search key with the re-ordered rules stored in the content search system of FIG. 1.

FIG. 4B is an illustrative flow chart 450 depicting an exemplary operation for comparing a search key with the re-ordered rules stored in the content search system 100 of FIG. 1. Referring also to FIGS. 1 and 3B-3C, the search key is provided to the covering prefix table 320 and compared with the covering prefix entries stored therein (452). As discussed above, each covering prefix entry includes a SA common prefix value and a DA common prefix value. Then, one of the enable signal bitmaps stored in the covering prefix table 320 is selected in response to the comparison between the search key and the covering prefix entries (454). Next, the selected enable signal bitmap is used to selectively enable a subset of the CAM blocks 102 for a search operation with the search key (456). Then, the search key is compared only with the rules stored in the enabled CAM blocks 102 (458). Finally, the resolution logic 340 determines the highest-priority rule that matches the search key (460).

Thus, as described above, each CAM block 102 is associated with either a SA covering prefix value and/or a DA covering prefix value. However, it is possible that one or more selected CAM blocks 102 can include a group of rule entries for which the most general prefix is null (e.g., the covering prefix value would match any search key). Further, when two consecutive (e.g., adjacently stored) rules cannot match the same search key, the ordering of such two rules can be altered without changing the semantics of the ACL and/or application of corresponding action. In this manner, such consecutive rule entries can be repeatedly swapped to increase the specificity of the covering prefix values assigned to the CAM blocks 102, which in turn further reduces power consumption by selectively enabling fewer number of CAM blocks 102 for search operations. For example, swapping rule entry locations can be used to increase the specificity of the covering prefix value of a particular CAM block 102 from "*" to "/8" to "/12" to "/16".

In addition, further reductions in power consumption can be realized by using gaps in the CAM blocks 102. More specifically, gaps can be implemented by inserting unmatchable entries (entries that cannot possibly match any search key) to fill up the CAM block. For example, if the first 999 entries of a 1024-entry CAM block 102 can be covered by a very specific covering prefix value, and the next 25 entries are more general, then to prevent the CAM block 102 from being frequently enabled to accommodate the 25 more general rule entries, a gap of 25 empty entries can be inserted into the CAM block 102 so that the 25 more general rule entries are pushed to a next CAM block 102, thereby retaining the specificity of the covering prefix value corresponding to the aforementioned first 999 entries of the CAM block. In accordance with the present embodiments, these gap insertion techniques can be performed implemented using the pre-classification processor 120 of FIG. 1.

For other embodiments, one or more selected CAM block 102 can be assigned covering prefixes for both source addresses and destination addresses, and therefore all rules stored in such selected CAM blocks 102 would have prefixes equal to or more specific than the SA and DA covering prefix values.

Referring again to FIG. 1, covering prefix table 110 dynamically determines which of the CAM blocks 102(1)-102(n) to enable for search operations to reduce power consumption. The above examples populate the CAM blocks 102 by assigning covering prefix values thereto, loading rule entries into the CAM blocks 102 according to the assigned covering prefix values, and then loading the covering prefix table with covering prefix values that can include combinations of the covering prefix values assigned to the CAM blocks 102. For other embodiments, the source and/or destination addresses of the rules of an ACL can be divided into non-overlapping ranges and then stored in corresponding CAM blocks 102. For example, table 1 below shows an exemplary partitioning of ACL source address values according to address ranges and their storage into corresponding CAM blocks 102.

TABLE 1

| Partition | Range of Flattened ACL Source Addresses in Partition | Index Table (Assignment to CAM Block) |
|---|---|---|
| 1 | 10.00.00.00-15.15.00.00 | CAM block 102(1) |
| 2 | 15.15.00.01-17.17.17.17 | CAM block 102(2) |
| 3 | 17.17.17.18-77.77.77.77 | CAM block 102(3) |

Thus, given the exemplary partitioning of ACL source addresses shown above in Table 1, if an incoming search key has a source address that lies within one of the given non-overlapping ranges, then only the one corresponding CAM block 102 can be enabled for the search operation (while the other CAM blocks 102 are disabled).

The above partitioning technique exemplifies only one scheme for partitioning (i.e., using non-overlapping ranges). However many different schemes for partitioning are possible and envisioned, and presented in additional embodiments described herein. Table 2 depicts several other schemes for partitioning.

TABLE 2

| Partitioning Scheme Name | Index Table Characteristics |
|---|---|
| Partition by Independent Source and Destination | One index table entry for source and another index table entry for destination (an example of two field indexing) |
| Partition by Half-index Source and Half-index Destination | One index table entry for source half-index and another index table entry for destination half-index |
| Partition by Concatenated Source and Destination | One index table entry for a concatenated source and destination |

Figure 5:
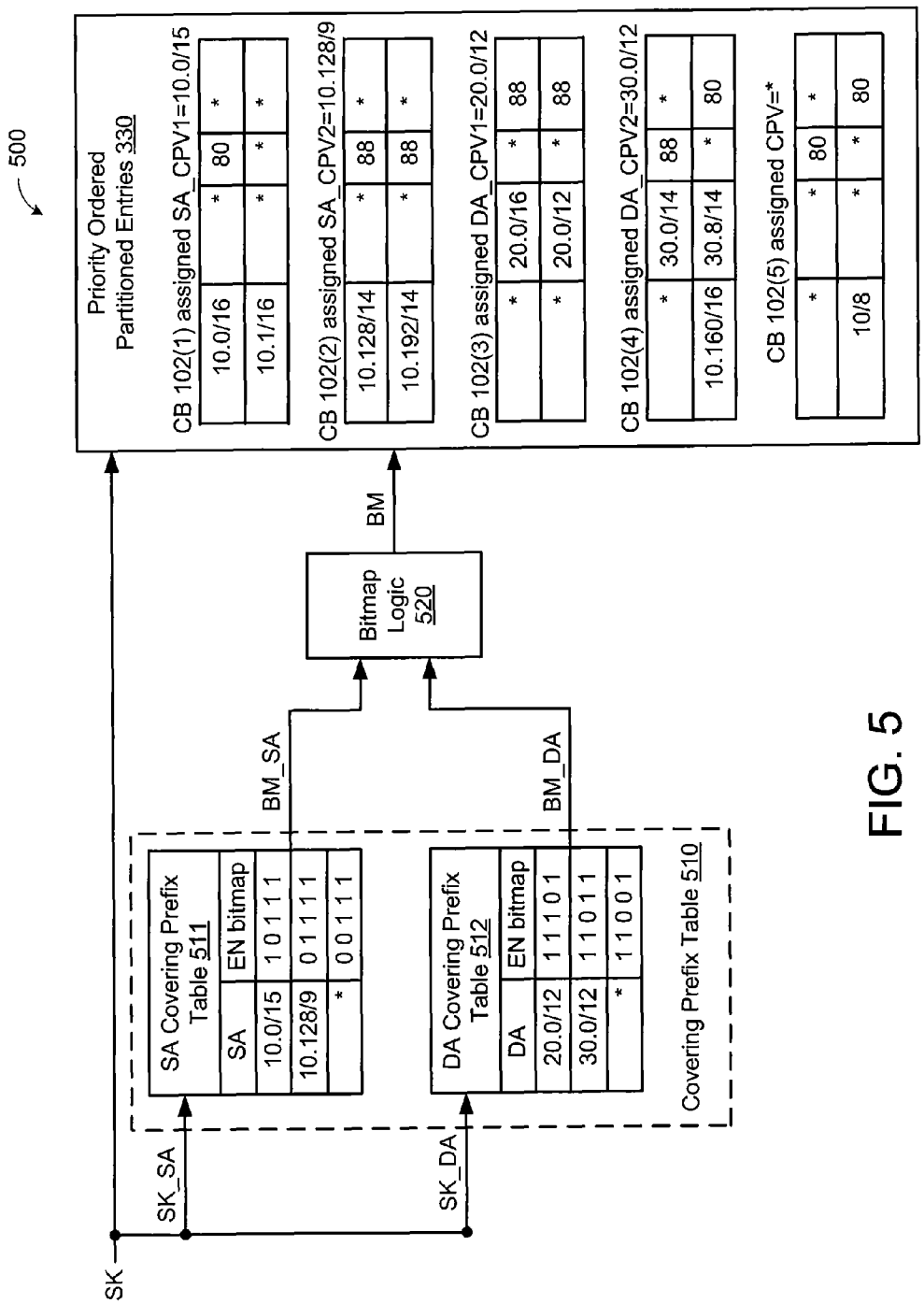
FIG. 5 illustrates the re-ordering of a number of rules of an ACL into a plurality of rule groups and the storage of the rule groups into corresponding CAM blocks of the search system of FIG. 1 in accordance with other embodiments.

For example, FIG. 5 shows an exemplary partitioning of the rules of original ACL table 310 using half-index values. More specifically, FIG. 5 shows a content search system 500 that is another embodiment of content search system 100 of FIG. 1. Content search system 500 is shown to include an SA covering prefix table 511, a DA covering prefix table 512, bitmap logic 520, and ordered entries 330 stored in CAM blocks 102(1)-102(5). For simplicity, the original rule table 310 of FIG. 3A is not shown in FIG. 5. Together, the SA covering prefix table 511 and the DA covering prefix table 512 form a covering prefix table 510 that is another embodiment of covering prefix table 320 of FIG. 3A. The SA covering prefix table 511 includes an input to receive the SA portion of a search key (SK_SA), and includes an output coupled to bitmap logic 520. The DA covering prefix table 512 includes an input to receive the DA portion of a search key (SK_DA), and includes an output coupled to bitmap logic 520. The bitmap logic 520 includes an output coupled to enable inputs of CAM blocks 102(1)-102(5).

Referring also to FIG. 3A, instead of storing covering prefix entries having pairs of SA common prefix values and DA common prefix values, as stored in covering prefix table 320 of FIG. 3A, the SA covering prefix table 511 of FIG. 5 stores only the 3 unique SA common prefix values (e.g., 10.0/15, 10.128/9, and *) that were generated by the pre-classification processor 120. Note that these 3 unique SA common prefix values are assigned to CAM blocks 102(1), 102(2), and 102(5), respectively, as depicted in FIG. 5 and discussed above with respect to FIG. 3A. The SA enable signal bitmaps stored in the SA covering prefix table 511 can be derived from the enable signal bitmaps stored in covering prefix table 320 by (1) copying the enable bits corresponding to SA CAM blocks 102(1) and 102(2) and setting the other bits to logic high to enable the non-SA CAM blocks 102(3)-102(5). The non-SA CAM blocks 102(3)-102(4) can be disabled by the DA covering prefix table 512 during search operations, as described below.

For one example, the bitmap "10111" for the first SA entry 10.0/15 can be generated (1) by setting the first two bits $B_1B_2$="10" because the first 2 bits of all the bitmaps corresponding to the SA common prefix value 10.0/15 in covering prefix table 320 are "10", and the other bits $B_3B_4B_5$ are set to high to enable the other CAM blocks 102(3)-102(5). For another example, the bitmap "01111" for the second SA common prefix value 10.128/9 can be generated (1) by setting the first two bits $B_1B_2$="01" because the first 2 bits of all the bitmaps corresponding to the SA common prefix value 10.128/9 in covering prefix table 320 are "01", and the other bits $B_3B_4B_5$ are set to high to enable the other CAM blocks 102(3)-102(5). Further, the bitmap "00111" for the third SA entry * can be generated (1) by setting the first two bits $B_1B_2$="00" because the first 2 bits of all the bitmaps corresponding to the SA common prefix value * in covering prefix table 320 are "00", and the other bits $B_3B_4B_5$ are set to high to enable the other CAM blocks 102(3)-102(5).

Similarly, the DA covering prefix table 512 of FIG. 5 stores only the 3 unique DA common prefix values (e.g., 20.0/12, 30.0/12, and *) that were generated by the pre-classification processor 120. Note that these 3 unique DA common prefix values are assigned to CAM blocks 102(3), 102(4), and 102(5), respectively, as depicted in FIG. 5 and discussed above with respect to FIG. 3A. The DA enable signal bitmaps stored in the DA covering prefix table 512 can be derived from the enable signal bitmaps stored in covering prefix table 320 by (1) copying the enable bits corresponding to DA CAM blocks 102(3) and 102(4) and setting the other bits to logic high to enable the non-DA CAM blocks 102(1)-102(2) and 102(5). The non-DA CAM blocks 102(1)-102(2) can be disabled by the SA covering prefix table 511 during search operations, as described above.

For one example, the bitmap "11101" for the first DA entry 20.0/12 can be generated (1) by setting the two bits $B_3B_4$="10" because the third and fourth bits of all the bitmaps corresponding to the DA common prefix value 20.0/12 in covering prefix table 320 are "10", and the other bits $B_1B_2$ and $B_5$ are set to high to enable the other CAM blocks 102(1), 102(2), and 102(5). For another example, the bitmap "11011" for the second DA entry 30.0/12 can be generated (1) by setting the two bits $B_3B_4$="01" because the third and fourth bits of all the bitmaps corresponding to the DA common prefix value 30.0/12 in covering prefix table 320 are "01", and the other bits $B_1B_2$ and $B_5$ are set to high to enable the other CAM blocks 102(1), 102(2), and 102(5). Further, the bitmap "11001" for the third DA entry * can be generated (1) by setting the two bits $B_3B_4$="00" because the third and fourth bits of all the bitmaps corresponding to the DA common prefix value * in covering prefix table 320 are "00", and the other bits $B_1B_2$ and $B_5$ are set to high to enable the other CAM blocks 102(1), 102(2), and 102(5).

The bitmap logic 520 includes a first input to receive a selected SA bitmap (BM_SA) from SA covering prefix table 511, a second input to receive a selected DA bitmap (BM_DA) from DA covering prefix table 512, and includes an output coupled to CAM blocks 102(1)-102(5). In operation, bitmap logic 520 logically combines the selected bitmaps BM_SA and BM_DA to generate the enable signal bitmap (BM) provided to CAM blocks 102(1)-102(5). For exemplary embodiments described herein, the bitmap logic 520 performs a bit-wise logical AND operation on BM_SA and BM_DA to generate BM. Of course, for other embodiments, bitmap logic 520 can perform other logical operations on BM_SA and BM_DA to generate BM.

During search operations, the search key (SK) is provided to both SA covering prefix table 511 and to DA covering prefix table 512 and compared with the entries stored therein. More specifically, in response to a comparison between SK and the SA common prefix values, SA covering prefix table 511 provides a selected SA bitmap as BM_SA to bitmap logic 520, and in response to a comparison between SK and the DA common prefix values, DA covering prefix table 512 provides a selected DA bitmap as BM_DA to bitmap logic 520. Then, bitmap logic 520 logically combines BM_SA and BM_DA to generate BM, which in turn selectively enables a subset of CAM blocks 102(1)-102(5) for a compare operation with the search key.

Note that for a given search key, the BM generated by bitmap logic 520 is the same as the bitmap BM selected by covering prefix table 320 of FIG. 3A. More specifically, using the above example of FIG. 3C, the search key SK1 (having an SA portion SK1_SA=10.160.0.0, a DA portion SK1_DA=30.8.0.0, a source port portion SK1_SP=80, and a destination port portion SK1_DP=80) is provided to content search system 500 for a search operation. The SA portion of SK1, SK1_SA=10.160.0.0, is provided as a search key to SA covering prefix table 511 and compared with the SA common prefix values stored therein. Note that SK1_SA=10.160.0.0 matches the SA_CPV1=10.128/9 stored in the second storage location of SA covering prefix table 511, and therefore SA covering prefix table 511 provides the corresponding bitmap BM_SA=01111 to bitmap logic 520.

Similarly, the DA portion of SK1, SK1_DA=30.8.0.0, is provided as a search key to DA covering prefix table 512 and compared with the DA common prefix values stored therein. Note that SK1_DA=30.8.0.0 matches the DA_CPV2=30.0/12 stored in the second storage location of DA covering prefix table 512, and therefore DA covering prefix table 512 provides the corresponding bitmap BM_DA=11011 to bitmap logic 520.

In response thereto, bitmap logic 520 performs a bitwise logical AND operation on BM_SA=01111 and BM_DA=11011 to generate a bitmap BM=01011, which is the same bitmap generated by the covering prefix table 320 of FIG. 3C, and therefore enables CAM blocks 102(2), 102(4), and 102(5) for the search operation while disabling the other CAM blocks 102(1) and 102(3). Thus, the results generated by the content search system 500 of FIG. 5 will be the same as the results generated by the content search system 300 of FIG. 3C. However, the system 500 of FIG. 5 uses less memory resources than the system 300 of FIG. 3C. More specifically, the covering prefix tables 511 and 512 of FIG. 5 use fewer entry locations than covering prefix table 320 of FIG. 3C to store the same representative data. Indeed, while the covering prefix table 320 of FIG. 3C stores all combinations of the SA and DA common prefix values, each of covering prefix tables 511 and 512 of FIG. 5 stores only unique common prefix values. For example, while the covering prefix table 320 uses 9 storage locations to store 9 associated covering prefix entries, SA covering prefix table 511 uses only 3 storage locations to store 3 associated unique SA common prefix values, and DA covering prefix table 512 uses only 3 storage locations to store 3 associated unique DA common prefix values. Thus, while the covering prefix table 320 of FIG. 3C uses 9 storage locations to store covering prefix information for the rules or original ACL table 310, the covering prefix table 510 of FIG. 5 uses only 2×3=6 storage locations that can be half the width of the storage locations of covering prefix table 320 of FIGS. 3A and 3C.

While particular embodiments have been shown and described, it will be apparent to those skilled in the art that changes and modifications may be made without departing from this disclosure in its broader aspects and, therefore, the appended claims are to encompass within their scope all such changes and modifications as fall within the true spirit and scope of this disclosure. Further, it should be noted that the various circuits disclosed herein may be described using computer aided design tools and expressed (or represented as data and/or instructions embodied in various computer-readable media) in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL; formats supporting register level description languages such as RTL; and formats supporting geometry description languages such as GDSII, GDSIII, GDSIV, CIF, MEBES and any other suitable formats and languages.

What is claimed is:

1. A method of comparing a search key to a plurality of access control list (ACL) rules stored in a plurality of content addressable memory (CAM) blocks of a content search system, the method comprising:
   generating a covering prefix table comprising a plurality of covering prefix entries and an enable signal bitmap;
   storing the plurality of covering prefix entries in a classification CAM block;
   storing the enable signal bitmap in a random access memory;
   comparing the search key to the plurality of covering prefix entries stored in the covering prefix table, wherein each of the plurality of covering prefix entries corresponds to a respective CAM block from among the plurality of CAM blocks;
   selectively enabling a subset of the plurality of CAM blocks;
   comparing the search key with each respective ACL rule from among the plurality of ACL rules stored in the subset of the plurality of CAM blocks;
   determining a best match between the search key and the plurality of ACL rules; and
   determining a match address or an index of a CAM block from among the subset of the plurality of CAM blocks whose respective ACL rule has the best match.

2. The method of claim 1, wherein the plurality of covering prefix entries comprises:
   a source address value that is shared by the plurality of ACL rules stored in a first CAM block from among the plurality of CAM blocks; and
   a destination address value that is shared by the plurality of ACL rules stored in a second CAM block from among the plurality of CAM blocks.

3. The method of claim 2, wherein each covering prefix entry from among the plurality of covering prefix entries comprises a unique combination of the source address value and the destination address value.

4. The method of claim 1, further comprising storing the plurality of ACL rules in the plurality of CAM blocks according to their common source values and common destination values, irrespective of relative priority of the ACL rules.

5. The method of claim 4, further comprising storing a priority value of each ACL rule from among the plurality of ACL rules.

6. The method of claim 5, wherein determining the best match further comprises using the priority values.

7. The method of claim 1, wherein the enable signal bitmap comprises a plurality of enable signals, each of the plurality of enable signals to selectively enable a corresponding one of the plurality of CAM blocks.

8. An apparatus for comparing a search key to a plurality of access control list (ACL) rules stored in a plurality of content addressable memory (CAM) blocks, comprising:
   means for generating a covering prefix table comprising a plurality of covering prefix entries and an enable signal bitmap;
   means for storing the plurality of covering prefix entries in a classification CAM block;
   means for storing the enable signal bitmap in a random access memory;
   means for comparing the search key to the plurality of covering prefix entries stored in the covering prefix table, wherein each of the plurality of covering prefix entries corresponds to a respective CAM block from among the plurality of CAM blocks;
   means for selectively enabling a subset of the plurality of CAM blocks;
   means for comparing the search key with each respective ACL rule from among the plurality of ACL rules stored in the subset of the plurality of CAM blocks;
   means for determining a best match between the search key and the plurality of ACL rules; and
   means for determining a match address or an index of a CAM block from among the subset of the plurality of CAM blocks whose respective ACL rule has the best match.

9. The apparatus of claim 8, wherein the plurality of covering prefix entries comprises:
   a source address value that is shared by the plurality of ACL rules stored in a first CAM block from among the plurality of CAM blocks; and
   a destination address value that is shared by the plurality of ACL rules stored in a second CAM block from among the plurality of CAM blocks.

10. The apparatus of claim 9, wherein each covering prefix entry from among the plurality of covering prefix entries comprises a unique combination of the source address value and the destination address value.

11. The apparatus of claim 8, further comprising means for storing the plurality of ACL rules in the plurality of CAM blocks according to their common source values and common destination values, irrespective of relative priority of the ACL rules.

12. The apparatus of claim 11, further comprising means for storing a priority value of each ACL rule from among the plurality of ACL rules.

13. The apparatus of claim 12, wherein the means for determining the best match comprises using the priority values.

14. The apparatus of claim 8, wherein the enable signal bitmap comprises a plurality of enable signals, each of the plurality of enable signals to selectively enable a corresponding one of the plurality of CAM blocks.

15. A content search system for comparing a search key to a plurality of access control list (ACL) rules, the system comprising:
   a plurality of content addressable memory (CAM) blocks, wherein each of a first set of the CAM blocks from among the plurality of CAM blocks is configured to store a first corresponding group of ACL rules from among the plurality of ACL rules that share an associated common source address prefix value, and wherein each of a second set of the CAM blocks from among the plurality of CAM blocks is configured to store a second corresponding group of ACL rules from among the plurality of ACL rules that share an associated common destination address prefix value;

a classification CAM block configured to store a plurality of covering prefix entries, wherein a respective covering prefix entry from among the plurality of covering prefix entries includes a common source address prefix value and a common destination address prefix value; and a bitmap memory configured to:
  store an enable signal bitmap for each of the plurality of covering prefix entries; and
  forward a selected one of the enable signal bitmaps to the plurality of CAM blocks in response to a compare operation.

16. The system of claim 15, wherein each covering prefix entry from among the plurality of covering prefix entries includes a unique pair of the common source address prefix value and the common destination address prefix value.

17. The system of claim 15, wherein the enable signal bitmaps indicate which CAM block from among the plurality of CAM blocks stores ACL rules associated with a corresponding covering prefix entry from among the plurality of covering prefix entries.

18. The system of claim 15, further comprising:
  resolution logic, coupled to the plurality of CAM blocks, configured to determine a best match between the search key and the plurality of ACL rules.

19. The system of claim 18, wherein the resolution logic comprises a memory to store a priority value for each of the plurality of ACL rules stored in the plurality of CAM blocks.

20. The system of claim 15, wherein the plurality of ACL rules is stored in the plurality of CAM blocks according to their common source values and common destination values, irrespective of relative priority of the plurality of ACL rules.

21. The system of claim 15, wherein the enable signal bitmaps comprise a plurality of enable signals, each of the plurality of enable signals to selectively enable a corresponding one of the plurality of CAM blocks.

22. The system of claim 15, furthering comprising:
  a classification processor configured to analyze the plurality of ACL rules for commonalities to generate the common source address prefix values and the common destination address prefix values.

23. The system of claim 22, wherein the classification processor is further configured to form the first and the second corresponding groups of ACL rules in response to the common address prefix values.

24. The system of claim 23, wherein the classification processor is further configured to store the first and the second corresponding groups of the ACL rules into corresponding CAM blocks from among the plurality of CAM blocks according to the common address prefix values.

25. The system of claim 22, wherein the classification processor is further configured to generate pairs of covering prefix entries and enable signal bitmaps.

* * * * *